(12) United States Patent
Abdallah (10) Patent No.: US 12,071,929 B2
(45) Date of Patent: Aug. 27, 2024

(54) MODIFIED SAVONIUS WIND TURBINE (71) Applicant: University of Cincinnati, Cincinnati, OH (US)

(72) Inventor: Shaaban Abdallah, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 0 days.

(21) Appl. No.: 18/272,243

(22) PCT Filed: Jan. 14, 2022

(86) PCT No.: PCT/US2022/012446
§ 371 (c)(1),
(2) Date: Jul. 13, 2023

(87) PCT Pub. No.: WO2022/155426
PCT Pub. Date: Jul. 21, 2022

(65) Prior Publication Data
US 2024/0060468 A1     Feb. 22, 2024

Related U.S. Application Data (60) Provisional application No. 63/137,647, filed on Jan. 14, 2021.

(51) Int. Cl.
*F03D 3/06*     (2006.01)
*F03D 3/00*     (2006.01)

(52) U.S. Cl.
CPC .............. *F03D 3/009* (2023.08); *F03D 3/061* (2013.01); *F05B 2240/213* (2013.01)

(58) Field of Classification Search
CPC . F03D 3/009; F03D 3/061; F03D 3/06; F03D 3/00; F03D 3/02; F03D 3/005;
(Continued)

(56) References Cited

U.S. PATENT DOCUMENTS 4,005,947 A * 2/1977 Norton .................... F03D 3/007
416/243
9,695,799 B2 * 7/2017 Aihara .................. F03D 1/0633
(Continued)

FOREIGN PATENT DOCUMENTS

DE        102014001891 A1    8/2015
WO        2013183892 A1      12/2013
WO    WO-2013183892 A1 * 12/2013 ............... F03D 3/02

OTHER PUBLICATIONS

Brunner, Franz et al., "Wind Turbine or Hydroelectric Power Plant", Wipo 2015107061 A1, Jul. 23, 2015 (Year: 2015).*
(Continued)

*Primary Examiner* — Woody A Lee, Jr.
*Assistant Examiner* — Joshua R Beebe
(74) *Attorney, Agent, or Firm* — Dinsmore & Shohl LLP (57) ABSTRACT A savonius wind turbine including a rotational shaft and a compound blade operatively coupled to the rotational shaft is provided. The compound blade includes a primary blade portion and a secondary blade portion. The primary blade portion extends between a first end and a second end and defines a primary concave surface therebetween. The secondary blade portion is coupled to the primary blade portion between the first end and the second end. The secondary blade portion defines a secondary concave surface configured to generate a torque about the rotational shaft.

12 Claims, 3 Drawing Sheets (58) Field of Classification Search
CPC .......... F05B 2240/213; F05B 2240/211; F05B 2240/30; Y02E 10/74; Y10S 416/09
See application file for complete search history.

(56) References Cited

U.S. PATENT DOCUMENTS

| | | | |
|---|---|---|---|
| 2014/0010654 A1* | 1/2014 | Fajardo | F03D 3/061 416/147 |
| 2014/0367972 A1* | 12/2014 | Rhee | F03D 9/28 290/55 |
| 2019/0093629 A1* | 3/2019 | Juarez | H02K 7/183 |
| 2020/0240392 A1* | 7/2020 | Rodway | F03D 3/005 |
| 2022/0042488 A1* | 2/2022 | Paden | F03D 1/0675 |

OTHER PUBLICATIONS

International Search Report and Written Opinion, in reference, to co-pending PCT/US2022/12446 filed Jan. 14, 2022.

\* cited by examiner

MODIFIED SAVONIUS WIND TURBINE

CROSS REFERENCE TO RELATED APPLICATIONS

This application is a § 371 National Stage Application of International Application Serial No. PCT/US2022/012446, filed Jan. 14, 2022, and claims priority to U.S. Provisional Application Ser. No. 63/137,647, filed Jan. 14, 2021, the entire disclosures of which are hereby incorporated by reference.

TECHNICAL FIELD

The present specification generally relates to vertical axis wind turbines and assemblies thereof.

BACKGROUND

Vertical axis wind turbines may be used to harness wind energy with a number of blades that rotate about a vertical axis. One type of vertical axis wind turbine is a savonius wind turbine. As will be described in greater detail below, a savonius wind turbine generally has a number of blades that each have a curved cross-sectional shape forming a concave side and a convex side. The blades may be arranged such that each of the curved cross-sectional shapes "points" in the same direction of rotation about the vertical axis. As wind contacts the blades, it will impart a greater drag force on a concave side than it will on a convex side, causing rotation of the blades about the vertical axis. As the blades rotate, their orientation relative to the wind direction changes. Accordingly, the torque generated by the wind force acting on the blades may cycle between a maximum torque and a minimum torque. As a result of the torque variation, savonius wind turbines may be inefficient as compared to other types of wind turbines. It therefore may be beneficial for a savonius wind turbine design that offers improved efficiency by providing a more consistent torque about the vertical axis.

SUMMARY

Additional features and advantages of the present disclosure will be set forth in the detailed description, which follows, and in part will be apparent to those skilled in the art from that description or recognized by practicing the embodiments described herein, including the detailed description, which follows the claims, as well as the appended drawings.

In a first aspect A1, a savonius wind turbine includes a rotational shaft and a compound blade operatively coupled to the rotational shaft. The compound blade includes a primary blade portion and a secondary blade portion. The primary blade portion extends between a first end and a second end and defines a primary concave surface therebetween. The secondary blade portion is coupled to the primary blade portion between the first end and the second end. The secondary blade portion defines a secondary concave surface configured to generate a torque about the rotational shaft.

In a second aspect A2 according to the first aspect A1, the secondary blade portion is substantially semicircular. In a third aspect A3 according to any preceding aspect, the secondary blade portion has substantially the same shape as the primary blade portion. In a fourth aspect A4 according to any preceding aspect, the secondary blade portion is smaller than the primary blade portion. In a fifth aspect A5 according to any preceding aspect, the secondary blade portion is oriented substantially perpendicular to the primary blade portion. In a sixth aspect A6 according to any preceding aspect, the primary blade portion defines a primary torque radius. The secondary blade portion defines a secondary torque radius. The secondary torque radius is larger than the primary torque radius. In a seventh aspect A7 according to the sixth aspect A6, the secondary blade portion is scaled relative to the primary blade portion by a ratio of the primary torque radius to the secondary torque radius. In an eighth aspect A8 according to any preceding aspect, the secondary blade portion is coupled to the primary blade portion substantially halfway between the first end and the second end. In a ninth aspect A9 according to any preceding aspect, the primary blade portion and the secondary blade portion are integrally formed.

In a tenth aspect A10, a vertical axis wind turbine includes a rotational shaft, a first compound blade operatively coupled to the rotational shaft, and a second compound blade operatively coupled to the rotational shaft. The first compound blade includes a first primary blade portion extending between a first end and a second end and defining a primary concave surface therebetween. The first compound blade further includes a first secondary blade portion coupled to the first primary blade portion between the first end and the second end, the first secondary blade portion defining a secondary concave surface.

In an eleventh aspect A11 according to the tenth aspect A10, the first secondary blade portion is substantially perpendicular to the first primary blade portion. In a twelfth aspect A12 according to any of the tenth through eleventh aspects A10-A11, the second compound blade comprises a second primary blade portion and a second secondary blade portion coupled to the second primary blade portion. In a thirteenth aspect A13 according to the twelfth aspect A12, the second secondary blade portion is substantially perpendicular to the second primary blade portion. In a fourteenth aspect A14 according to any of the tenth through thirteenth aspects A10-A13, the second compound blade has substantially the same shape as the first compound blade. In a fifteenth aspect A15 according to any of the tenth through fourteenth aspects A10-A14, the first compound blade and the second compound blade are equally spaced about the rotational shaft. In a sixteenth aspect A16 according to any of the tenth through fifteenth aspects A10-A15, the first primary blade portion defines a primary torque radius. The first secondary blade portion defines a secondary torque radius. The secondary torque radius is larger than the primary torque radius. In a seventeenth aspect A17 according to the sixteenth aspect A16, the first secondary blade portion is scaled relative to the first primary blade portion by a ratio of the primary torque radius to the secondary torque radius.

In an eighteenth aspect A18, a vertical axis wind turbine includes a rotational shaft, a first compound blade operatively coupled to the rotational shaft, and a second compound blade operatively coupled to the rotational shaft. The first compound blade includes a primary blade portion extending between a first end and a second end and defining a primary concave surface therebetween. The first compound blade further includes a secondary blade portion coupled to the primary blade portion between the first end and the second end, the secondary blade portion defining a secondary concave surface. The second compound blade has substantially the same size and shape as the first compound blade.

In a nineteenth aspect A19 according to the eighteenth aspect A18, the primary blade portion defines a primary torque radius. The secondary blade portion defines a secondary torque radius. The secondary torque radius is larger than the primary torque radius. In a twentieth aspect A20 according to the nineteenth aspect A19, the secondary blade portion is scaled relative to the primary blade portion by a ratio of the primary torque radius to the secondary torque radius.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein, and together with the description, explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
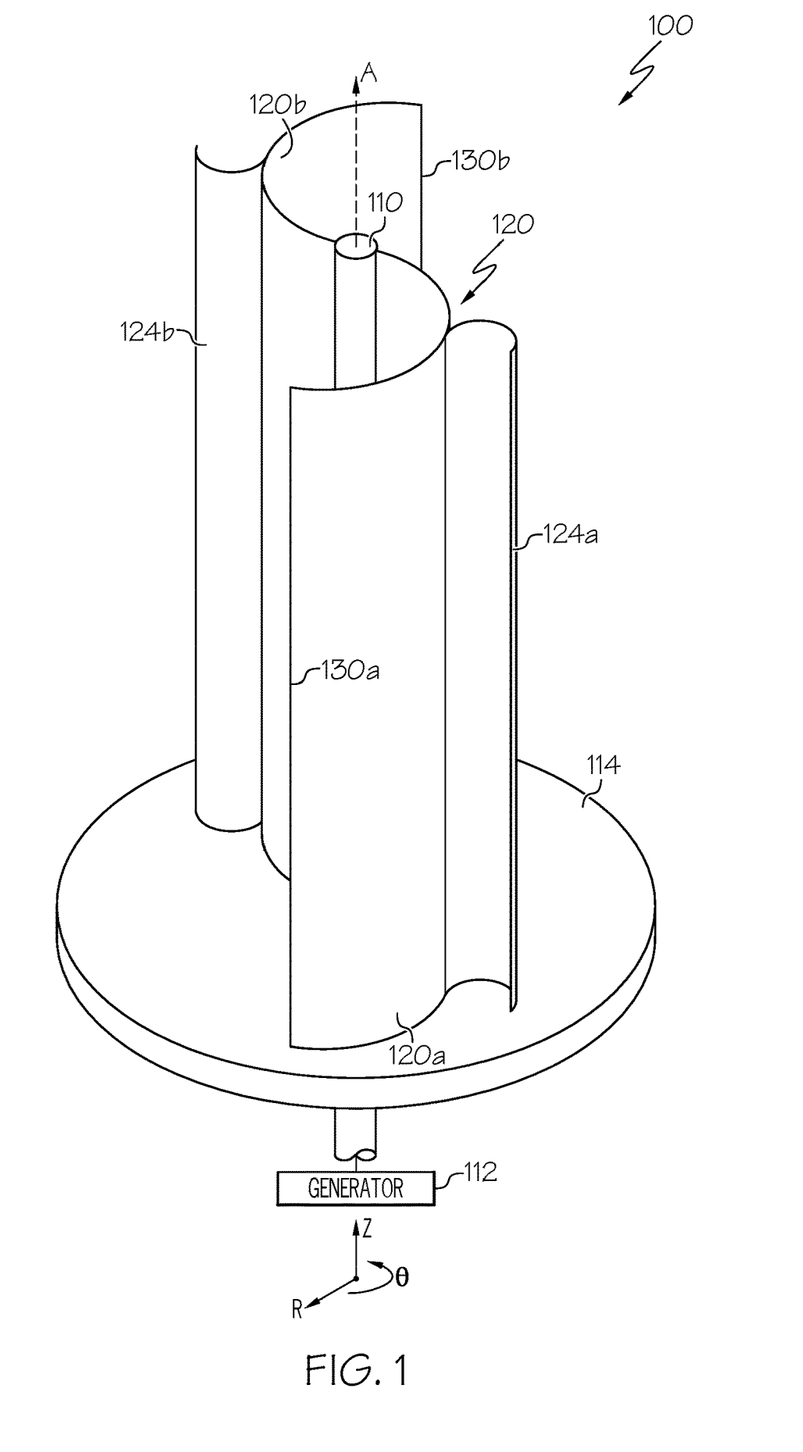
FIG. 1 schematically depicts a front perspective view of a savonius wind turbine according to one or more embodiments shown and described herein.

Reference will now be made in detail to various embodiments of devices, assemblies, and methods, examples of which are illustrated in the accompanying drawings. Whenever possible, the same reference numerals will be used throughout the drawings to refer to the same or like parts. FIG. 1 schematically depicts a savonius wind turbine that generally includes a rotational shaft and a compound blade operatively coupled to the rotational shaft. The compound blade includes a primary blade portion and a secondary blade portion. The primary blade portion extends between a first end and a second end and defines a primary concave surface therebetween. The secondary blade portion is coupled to the primary blade portion between the first end and the second end and defines a secondary concave surface. Each of the first concave surface and the second concave surface are configured to generate a torque about the rotational shaft so as to increase efficiency of the savonius wind turbine.

Directional terms as used herein—for example up, down, right, left, front, back, top, bottom—are made only with reference to the figures as drawn and are not intended to imply absolute orientation unless otherwise specified.

While vertical axis wind turbines are generally mounted such that the wind turbine axis and blade span directions are oriented vertically, vertical axis wind turbines may also be mounted in various other orientations relative to a ground surface, such as horizontal. Accordingly, the term "vertical" as used herein in connection with vertical axis wind turbines and related components is not limiting to a traditional vertical orientation of such components.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any device or assembly claim does not actually recite an order or orientation to individual components, or it is not otherwise specifically stated in the claims or description that the steps are to be limited to a specific order, or that a specific order or orientation to components of an device or assembly is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring to FIG. 1, an embodiment of a savonius turbine 100 is schematically shown. The savonius turbine 100 generally includes a rotational shaft 110 extending along a rotational axis A. The rotational axis A may extend in a vertical direction (e.g., along the vertical axis Z of the depicted cylindrical coordinate system). As will be described in greater detail herein, the rotational shaft 110 may be configured to rotate about the rotational axis A (e.g., in the rotational direction θ of the depicted cylindrical coordinate system). The rotational shaft 110 may be coupled to a generator 112 for converting rotational mechanical energy of the savonius turbine 100 into electrical energy.

The savonius turbine 100 may include one or more compound blades 120, such as compound blades 120a and 120b, operatively coupled to the rotational shaft 110. In embodiments, one or more compound blades 120 may be equally spaced about the rotational shaft 110, such as depicted. It is noted that while the savonius turbine 100 is depicted with two compound blades 120a and 120b, a greater or fewer number of compound blades is contemplated and possible. The one or more compound blades 120 may generally extend in the vertical direction (e.g., along the vertical axis Z of the depicted cylindrical coordinate system). As depicted, the one or more compound blades 120 may have approximately the same vertical height as the rotational shaft 110. However, in other embodiments, the one or more compound blades 120 may have a greater or lesser vertical height as compared to the rotational shaft 110.

Figure 2:
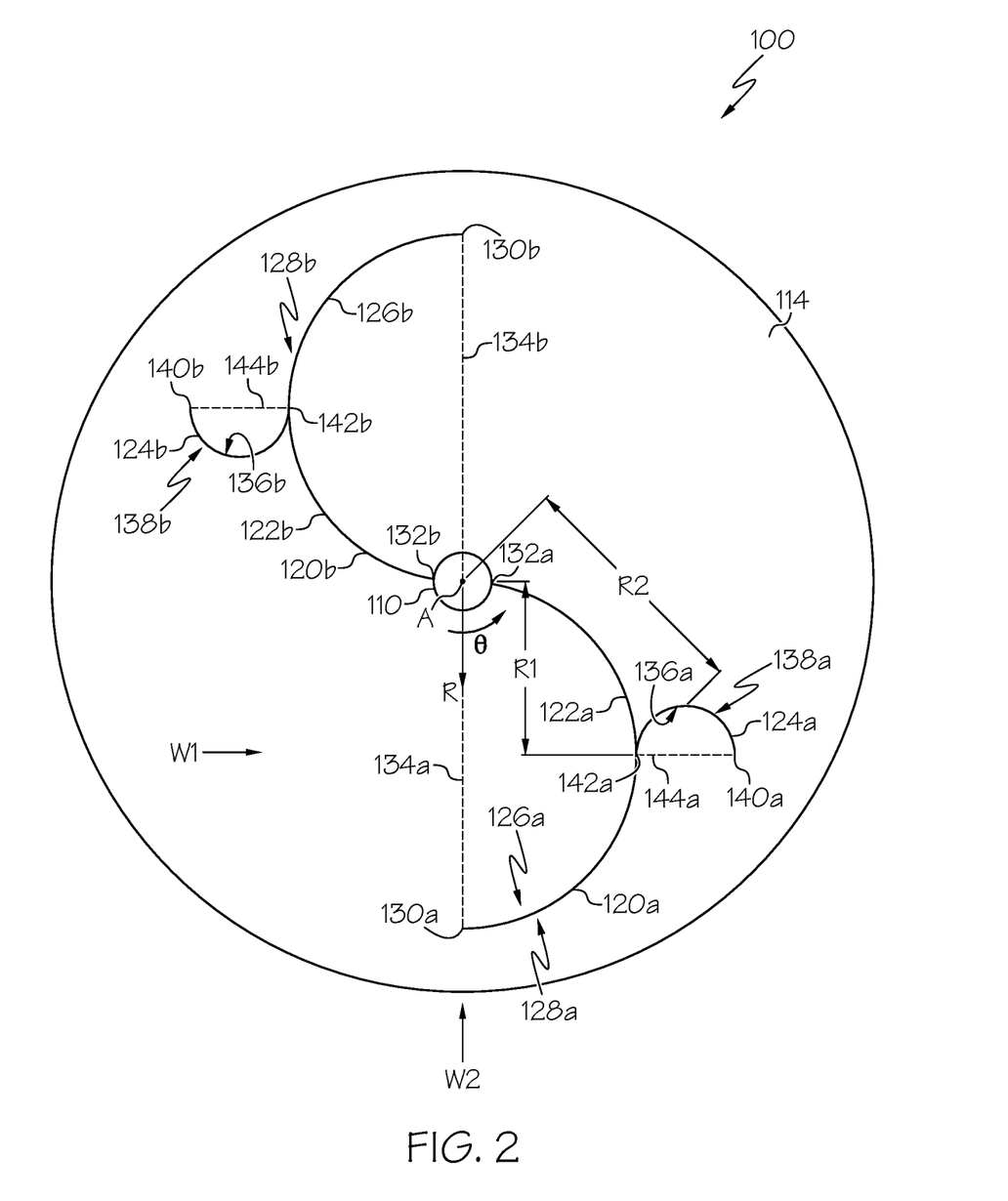
FIG. 2 schematically depicts a top cross-sectional view of the savonius wind turbine of FIG. 1 according to one or more embodiments shown and described herein.

Referring to FIG. 2, the compound blade 120a may include a primary blade portion 122a. The primary blade portion 122a may extend between a first end 130a and a second end 132a. Between the first end 130a and the second end 132a, the primary blade portion 122a may define a curved or C-shaped cross section. Accordingly, the primary blade portion 122a may define a concave surface 126a and a convex surface 128a. As depicted, the primary blade portion 122a may define a cross section that is substantially semi-circular. However, other shapes are contemplated and possible. For example, in some embodiments, the primary blade portion 122a may define an asymmetrical cross section in which the curvature is higher near the first end 130a than at the second end 132a. In other embodiments, the curvature may be higher at the second end 132a than at the first end 130a. Similarly, the compound blade 120b may have a primary blade portion 122b. The primary blade portion 122b may extend between a first end 130b and a second end 132b and define a concave surface 126b and a convex surface 128b, such as described above.

As depicted, each of the one or more compound blades 120 may be radially oriented relative to the rotational shaft 110. For example, the compound blade 120a may be oriented such that the first end 130a, the second end 132a, and the rotational axis A are radially aligned (e.g., along the radial direction R of the depicted cylindrical coordinate system). Accordingly, the first end 130a and the second end 132a may define a rotational plane 134a that extends radially relative to the rotational axis A, as shown. Similarly, the compound blade 120b may be radially oriented relative to the rotational shaft 110. The compound blade 120b may be oriented such that the first end 130b, the second end 132b, and the rotational axis A are aligned (e.g., along the radial direction R of the depicted cylindrical coordinate system). Accordingly, the first end 130b, the second end 132b may define a rotational plane 134b that extends radially relative to the rotational axis A, as shown.

In embodiments, the one or more compound blades 120 may be equally spaced about the rotational shaft 110. Accordingly, the rotational planes 134a and 134b may be equally spaced about the rotational axis A. As depicted, in some embodiments and particularly in embodiment having two compound blades, the rotational planes 134a and 134b may be substantially coplanar. However, it is noted that in embodiments with more than two compound blades, for example in embodiments with three or more compound blades, the rotational planes of the one or more compound blades 120 may not be coplanar.

Figure 3:
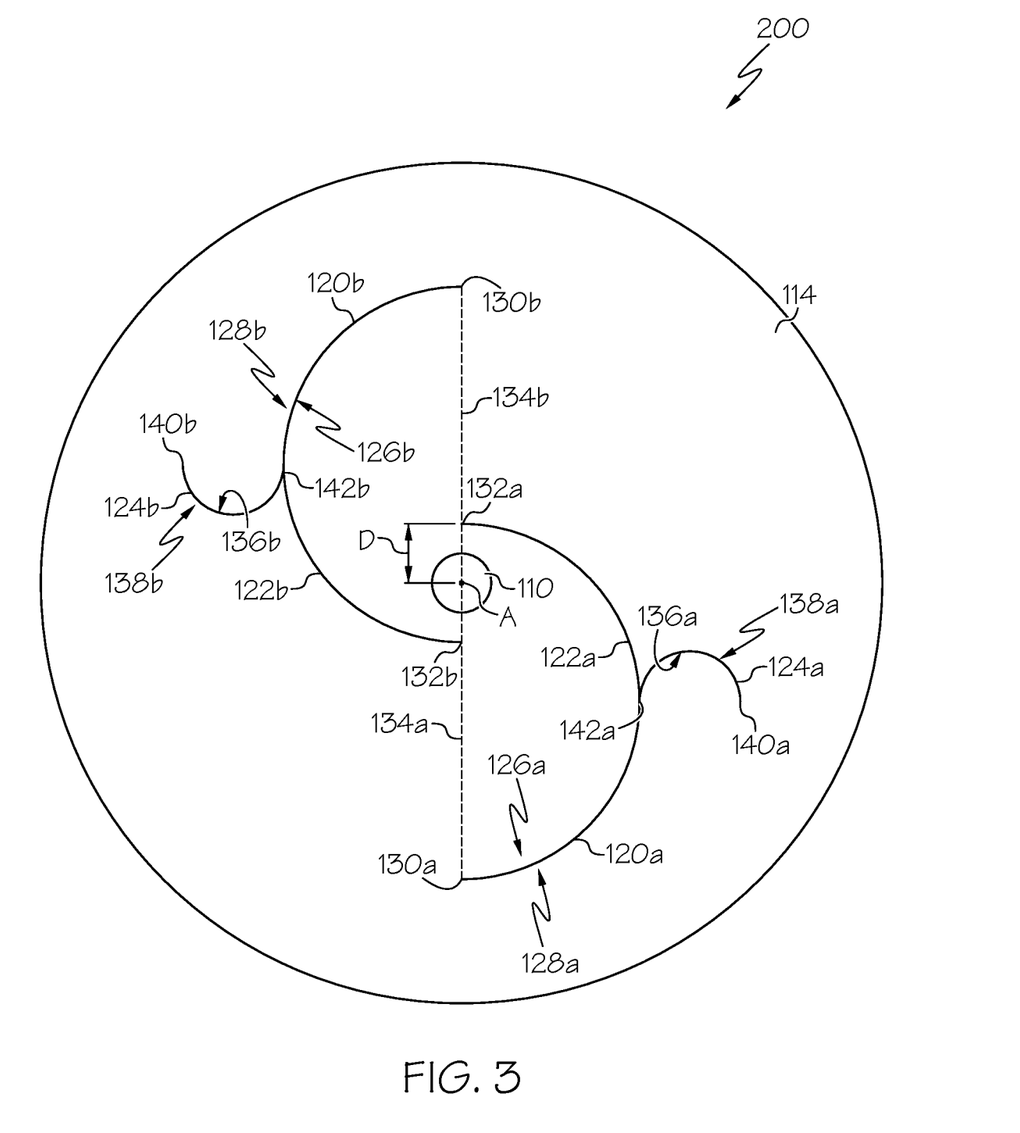
FIG. 3 schematically depicts a top cross-sectional view of a savonius wind turbine according to one or more embodiments shown and described herein.

Still referring to FIG. 2, in some embodiments the primary blade portions 122a and 122b may be formed integrally with the rotational shaft 110. However, other constructions are contemplated and possible. One such embodiment is depicted in FIG. 3. Referring to FIG. 3, the primary blade portions 122a and 122b may be oriented such that the second ends 132a and 132b are radially spaced from both the rotational shaft 110 and the rotational axis A (e.g., in the radial direction R of the depicted cylindrical coordinate system). In particular, the second end 132a may be spaced from the rotational axis A by a distance D that is larger than a radius of the rotational shaft 110. In such embodiments, the primary blade portions 122a and 122b may not be formed integrally with the rotational shaft 110. Instead, in some embodiments, the primary blade portions 122a and 122b may be oriented such that they do not contact the rotational shaft 110. In other embodiments, the primary blade portions 122a and 122b may be fixed relative to the rotational shaft 110 via one or more struts (not depicted) positioned along a vertical length of the rotational shaft 110 (e.g., along the vertical direction Z of the cylindrical coordinate system of FIG. 1) so as to maintain distance between the primary blade portions 122a and 122b and the rotational shaft 110.

Referring back to FIG. 2, as depicted, the primary blade portions 122a and 122b may be oriented about the rotational shaft 110 such that the concave surfaces 126a and 126b "point" in the same rotational direction about the rotational axis A (e.g., in the rotation direction θ of the depicted cylindrical coordinate system). Accordingly, relative to wind flowing in a constant direction, the concave surface 126a may face "toward" the wind while the concave surface 126b faces "away." For example, as depicted, the concave surface 126a faces "toward" a maximum torque direction W1. As will be appreciated by those skilled in the art, a concave surface, such as the concave surfaces 126a and 126b, will have a higher drag coefficient than a convex surface, such as the convex surfaces 128a and 128b. Accordingly, a wind (e.g., a wind traveling in the maximum torque direction W1) will exert a greater drag force on the concave surface 126a of the compound blade 120a than on the convex surface 128b of the compound blade 120b. The net difference between the drag forces acting on the concave surface 126a and the convex surface 128b will generate a net torque about the rotational axis A. In this way, the one or more compound blades 120 will rotate about the rotational axis A (e.g, in the rotational direction θ of the depicted cylindrical coordinate system). The rotational shaft 110, operatively coupled to the one or more compound blades 120 will therefore also rotate (e.g., in the rotational direction θ of the depicted cylindrical coordinate system).

Still referring to FIG. 2, the compound blade 120a may include a secondary blade portion 124a coupled to the primary blade portion 122a. The secondary blade portion 124a may have a similar shape to the primary blade portion 122a such as described above. Accordingly, the secondary blade portion 124a may extend between a first end 140a and a second end 142a and define a concave surface 136a and a convex surface 138a. The secondary blade portion 124a may define a rotational plane 144a that spans between the first end 140a and the second end 142a. In some embodiments, the secondary blade portion 124a may have substantially the same shape as the primary blade portion 122a. For example, as depicted, both the secondary blade portion 124a and the primary blade portion 122a may have a semicircular shape. In other embodiments, the secondary blade portion 124a and the primary blade portion 122a may not be semicircular but may still have the same curvature such that they are substantially the same shape.

The second end 142a of the secondary blade portion 124a may be coupled to the primary blade portion 122a at a location between the first end 130a and the second end 132a of the primary blade portion 122a. As depicted, the second end 142a of the secondary blade portion 124a may be coupled to the primary blade portion 122a about halfway between the first end 130a and the second end 132a of the primary blade portion 122a. However, other locations are contemplated and possible. For example, in some embodiments, the secondary blade portion 124a may be coupled closer to or further from the first end 130a. In particular, the position of the secondary blade portion 124a relative to the primary blade portion 122a may be particularized for a desired result, such as maximizing torque generated by the secondary blade portion 124a. In such an embodiment, the position of the secondary blade portion 124a relative to the primary blade portion 122a may be particularized using computational fluid dynamics (CFD) analysis and the like.

Still referring to FIG. 2, the secondary blade portion 124a may be oriented substantially perpendicular to the primary blade portion 122a. Accordingly, that the rotational plane 144a of the secondary blade portion 124a may be substantially perpendicular to the rotational plane 134a of the primary blade portion 122a, such as depicted. In some embodiments, the secondary blade portion 124a may be tangential to the primary blade portion 122a at its second end 142a, such as depicted. In some embodiments, the secondary blade portion 124a may be integrally formed with the primary blade portion 122*a*. In other embodiments, the secondary blade portion 124*a* may be coupled to the primary blade portion 122*a* via adhesive, bolts, screws, or any other appropriate mechanism.

Similarly, the compound blade 120*b* may include a secondary blade portion 124*b* substantially as described above. Accordingly, the secondary blade portion 124*b* may extend between a first end 140*b* and a second end 142*b* and define a concave surface 136*b* and a convex surface 138*b*. The secondary blade portion 124*b* may define a rotational plane 144*b* that spans between the first end 140*b* and the second end 142*b*. As will be described in greater detail herein, the secondary blade portions 124*a* and 124*b* may be smaller than the primary blade portions 122*a* and 122*b*. As depicted in FIG. 1, the secondary blade portions 124*a* and 124*b* may have the same vertical height as the primary blade portions 122*a* and 122*b* (e.g., along the vertical direction Z of the depicted cylindrical coordinate system). However, other geometries are contemplated and possible. For example, in embodiments, the secondary blade portions 124*a* and 124*b* may extend for only a portion of the vertical height of the primary blade portions 122*a* and 122*b*.

Referring to FIG. 1, the one or more compound blades 120 may be operatively coupled to the rotational shaft 110. In some embodiments, the one or more compound blades 120 may be operatively coupled with a support structure 114. The one or more compound blades 120 may be bolted, screwed, integrally formed or otherwise attached to the support structure 114. Accordingly, the rotational shaft 110 may be rotated upon a rotation of the one or more compound blades 120. The support structure 114 may extend from the rotational shaft 110 to the one or more compound blades 120. The support structure 114 may be a plate or a substrate, such as depicted. In other embodiments, the support structure 114 may be a plurality of struts, shafts, or rods connecting the one or more compound blades 120 to the rotational shaft 110. As depicted, the support structure 114 may have a substantially circular cross section in a horizontal direction (e.g., perpendicular to the vertical axis A). However, other shapes are contemplated and possible. For example, the support structure 114 may be rectangular, ovular, triangular, or any regular or non-regular polygonal or non-polygonal shape. In some embodiments, and as depicted in FIG. 1, the support structure 114 may be a lower support structure coupled to the bottom of the one or more compound blades 120. In other embodiments, the support structure 114 may be, alternatively or additionally, an upper support structure coupled to the top of the one or more compound blades 120. In some embodiments, for example in embodiments wherein the one or more compound blades 120 is integrally formed with the rotational shaft 110, a support structure 114 may not be included.

Each component of the vertical axis wind turbine, for example, the one or more compound blades 120 or the rotational shaft 110, may be made from a metallic material, such as aluminum or metal alloy, or non-metallic material, such as wood or composite material.

In light of FIGS. 1 and 2, the primary blade portions 122*a* and 122*b* may generate a torque about the rotational axis A. A maximum torque generated by the primary blade portions 122*a* and 122*b* may occur when the wind is aligned with the maximum torque direction W1. As depicted, the maximum torque direction W1 may be perpendicular to the rotational plane 134*a* and the rotational plane 134*b*. The maximum torque direction W1 may therefore be directed "into" the concave surface 126*a* of the primary blade portion 122*a*. In this orientation relative to the maximum torque direction W1, the primary blade portion 122*a*, acting alone, will generate a torque equal to the wind force multiplied by a torque radius R1. As will be appreciated by those skilled in the art, the torque radius R1 is a function of the shape of the primary blade portion 122*a*. In some embodiments, the torque radius R1 may be approximately half of a distance between the rotational axis A and the first end 130*a*, as depicted. However, in other embodiments, the torque radius R1 may be different.

As the primary blade portions 122*a* and 122*b* rotate about the rotational axis (e.g., in the rotational direction θ of the depicted cylindrical coordinate system), the wind will no longer be oriented in the maximum torque direction W1 relative to the primary blade portion 122*a*. In such a rotated position, the primary blade portion 122*a*, acting alone, will generate a torque equal to only the component of the wind force acting in the maximum torque direction W1 multiplied by the torque radius R1. Accordingly, a minimum torque generated by the primary blade portions 122*a* and 122*b* may occur when the wind is aligned with a minimum torque direction W2 that is parallel to the rotational plane 134*a* and/or the rotational plane 134*b*. In this orientation, the wind force acting in the minimum torque direction W2 is perpendicular to the maximum torque direction W1 and has no component acting in the maximum torque direction W1. Therefore, no torque or a negligible amount of torque may be generated by the primary blade portion 122*a* when the wind is aligned with a minimum torque direction W2.

Still in light of FIG. 2, the secondary blade portions 138*a* and 138*b* may similarly generate a torque about the rotational axis A. A maximum torque generated by the secondary blade portions 138*a* and 138*b* may occur when the wind is aligned with the minimum torque direction W2. As depicted, the minimum torque direction W2 may be perpendicular to the rotational plane 144*a* and the rotational plane 144*b*. The minimum torque direction W2 may therefore be directed "into" the concave surface 136*a* of the secondary blade portion 124*a*. In this orientation relative to W2, the secondary blade portion 124*a*, acting alone, will generate a torque equal to the wind force acting in the direction W2 multiplied by a torque radius R2. Accordingly, the secondary blade portions 138*a* and 138*b* may generate a torque about the rotational axis A when the torque generated by the primary blade portions 122*a* and 122*b* is at a minimum. This may increase an efficiency of the savonius turbine 100.

As depicted in FIG. 2, the torque radius R2 of the secondary blade portions 124*a* may be larger than the torque radius R1 of the primary blade portion 122*a*. Accordingly, if the secondary blade portion 124*a* and the primary blade portion 122*a* were sized the same, the secondary blade portion 124*a* may generate a larger torque than the primary blade portion 122*a*. For this reason, in some embodiments, it may be beneficial to size the secondary blade portion 124*a* to be smaller than the primary blade portion 122*a*. In this way, a more consistent total torque acting on the rotational shaft 110 may be achieved as the one or more compound blades 120 rotate. In particular, in some embodiments, the size of the secondary blade portion 124*a* may be the size of the primary blade portion 122*a* scaled by the ratio of the torque radius R1 to the torque radius R2. For example, in embodiments in which the primary blade portion 122*a* and the secondary blade portion 124*a* are each a semicircle having a diameter, the secondary blade portion 124*a* may be sized according to the equation $$d_2 = \left(\frac{R1}{R2}\right)d_1$$

where $d_2$ is the diameter of the secondary blade portion 124a and $d_1$ is the diameter of the primary blade portion 122a. The secondary blade portion 124b may similarly be sized relative to the primary blade portion 122b. In this way, the primary blade portions 122a and 122b the secondary blade portions 124a and 124b may generate the same maximum torque about the rotational axis A. Accordingly, the torque generated throughout the rotation of the savonius turbine 100 may be more consistent, and the overall efficiency may be increased.

In view of the above, it should now be understood that at least some embodiments of the present disclosure are directed to a savonius wind turbine that generally includes a rotational shaft and a compound blade operatively coupled to the rotational shaft. The compound blade includes a primary blade portion and a secondary blade portion. The primary blade portion extends between a first end and a second end and defines a primary concave surface therebetween. The secondary blade portion is coupled to the primary blade portion between the first end and the second end and defines a secondary concave surface. Each of the first concave surface and the second concave surface are configured to generate a torque about the rotational shaft so as to increase efficiency of the savonius wind turbine.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A savonius wind turbine comprising a rotational shaft extending along a rotational axis, and a compound blade operatively coupled to the rotational shaft, the compound blade comprising a primary blade portion and a secondary blade portion, wherein:
the primary blade portion extends between a primary first end and a primary second end and defines a primary semicircular concave surface therebetween;
the secondary blade portion is coupled to the primary blade portion between the primary first end and the primary second end; and
the secondary blade portion extends between a secondary first end and a secondary second end and defines a secondary semicircular concave surface configured to generate a torque about the rotational shaft, wherein:
the primary blade portion defines a primary torque radius R1, defined as the distance between the rotational axis and a point halfway between the primary first end and the primary second end;
the secondary blade portion defines a secondary torque radius R2, defined as the distance between the rotational axis and a point halfway between the secondary first end and the secondary second end; and
the secondary blade portion is scaled relative to the primary blade portion by a ratio of the primary torque radius to the secondary torque radius.

2. The savonius wind turbine of claim 1, wherein the secondary blade portion is smaller than the primary blade portion.

3. The savonius wind turbine of claim 1, wherein the secondary blade portion is oriented perpendicular to the primary blade portion.

4. The savonius wind turbine of claim 1, wherein the secondary blade portion is coupled to the primary blade portion halfway between the primary first end and the primary second end.

5. The savonius wind turbine of claim 1, wherein the primary blade portion and the secondary blade portion are integrally formed.

6. A vertical axis wind turbine comprising:
a rotational shaft extending along a rotational axis;
a first compound blade operatively coupled to the rotational shaft, the first compound blade comprising:
a first primary blade portion extending between a primary first end and a primary second end and defining a primary semicircular concave surface therebetween; and
a first secondary blade portion coupled to the first primary blade portion between the primary first end and the primary second end, the first secondary blade portion extending between a secondary first end and a secondary second end and defining a secondary semicircular concave surface; and
a second compound blade operatively coupled to the rotational shaft, wherein:
the first primary blade portion defines a primary torque radius R1, defined as the distance between the rotational axis and a point halfway between the primary first end and the primary second end;
the first secondary blade portion defines a secondary torque radius R2, defined as the distance between the rotational axis and a point halfway between the secondary first end and the secondary second end; and
the first secondary blade portion is scaled relative to the first primary blade portion by a ratio of the primary torque radius to the secondary torque radius.

7. The vertical axis wind turbine of claim 6, wherein the first secondary blade portion is perpendicular to the first primary blade portion.

8. The vertical axis wind turbine of claim 6, wherein the second compound blade comprises a second primary blade portion and a second secondary blade portion coupled to the second primary blade portion.

9. The vertical axis wind turbine of claim 8, wherein the second secondary blade portion is perpendicular to the second primary blade portion.

10. The vertical axis wind turbine of claim 6, wherein the second compound blade has the same shape as the first compound blade.

11. The vertical axis wind turbine of claim 6, wherein the first compound blade and the second compound blade are equally spaced about the rotational shaft.

12. A vertical axis wind turbine comprising:
a rotational shaft extending along a rotational axis;
a first compound blade operatively coupled to the rotational shaft, the first compound blade comprising:

a primary blade portion extending between a primary first end and a primary second end and defining a primary semicircular concave surface therebetween; and a secondary blade portion coupled to the primary blade portion between the primary first end and the primary second end, the secondary blade portion extending between a secondary first end and a secondary second end and defining a secondary semicircular concave surface; and a second compound blade operatively coupled to the rotational shaft, wherein the second compound blade has the same size and shape as the first compound blade, wherein:

the primary blade portion defines a primary torque radius R1, defined as the distance between the rotational axis and a point halfway between the primary first end and the primary second end;

the secondary blade portion defines a secondary torque radius R2, defined as the distance between the rotational axis and a point halfway between the secondary first end and the secondary second; and the secondary blade portion is scaled relative to the primary blade portion by a ratio of the primary torque radius to the secondary torque radius.

* * * * *